United States Patent
Luo

(10) Patent No.: US 11,458,657 B2
(45) Date of Patent: Oct. 4, 2022

(54) METHOD OF MICROCELLULAR FOAM MOLDING

(71) Applicant: Dongguan Hailex New Material Science and Technology Co., Ltd., Dongguan (CN)

(72) Inventor: Zhenhuan Luo, Guangdong (CN)

(*) Notice: Subject to any disclaimer, the term of this patent is extended or adjusted under 35 U.S.C. 154(b) by 683 days.

(21) Appl. No.: 16/414,789

(22) Filed: May 17, 2019

(65) Prior Publication Data

US 2019/0270228 A1    Sep. 5, 2019

(51) Int. Cl.
| | |
|---|---|
| *B29C 44/34* | (2006.01) |
| *C08J 9/12* | (2006.01) |
| *C08J 9/14* | (2006.01) |
| *C08G 18/48* | (2006.01) |
| *B29K 23/00* | (2006.01) |
| *B29K 101/12* | (2006.01) |
| *B29K 21/00* | (2006.01) |
| *B29L 31/50* | (2006.01) |

(52) U.S. Cl.
CPC ......... *B29C 44/3453* (2013.01); *C08G 18/48* (2013.01); *C08J 9/122* (2013.01); *C08J 9/14* (2013.01); *B29K 2021/003* (2013.01); *B29K 2023/0633* (2013.01); *B29K 2023/083* (2013.01); *B29K 2023/12* (2013.01); *B29K 2101/12* (2013.01); *B29L 2031/50* (2013.01); *C08G 2110/0041* (2021.01); *C08J 2203/06* (2013.01); *C08J 2203/08* (2013.01); *C08J 2300/22* (2013.01); *C08J 2300/26* (2013.01); *C08J 2375/04* (2013.01)

(58) Field of Classification Search
CPC ...... B29C 44/3453; C08G 18/48; C08J 9/122; B29K 2021/003; B29K 2023/0633; B29K 2023/083; B29K 2023/12; B29K 2101/12
See application file for complete search history.

(56) References Cited

U.S. PATENT DOCUMENTS

| | | | |
|---|---|---|---|
| 2016/0257052 A1* | 9/2016 | Sun | B29C 49/22 |
| 2018/0273718 A1 | 9/2018 | Hailex | |
| 2018/0345546 A1* | 12/2018 | Chen | B29C 48/92 |
| 2019/0061211 A1* | 2/2019 | Luo | C08J 9/122 |
| 2020/0281314 A1* | 9/2020 | Stockbridge | A43B 13/188 |

\* cited by examiner

*Primary Examiner* — Nahida Sultana
(74) *Attorney, Agent, or Firm* — Novoclaims Patent Services LLC; Mei Lin Wong

(57) ABSTRACT

A method of microcellular foam molding an article is provided with, in one embodiment, filling a mold with a polyolefin compound; adding a crosslinking agent to the polyolefin compound to form a crosslinked mold; placing the crosslinked mold in a second mold having vent holes; placing the second mold in a pressure vessel; dissolving gas under high pressure to form a supercritical fluid (SCF) in the pressure vessel; effusing the SCF through the vent holes into the crosslinked mold to form a SCF permeated mold; releasing pressure of the pressure vessel to cause the SCF permeated mold to foam; and finishing a foamed article in the second mold.

16 Claims, 2 Drawing Sheets

METHOD OF MICROCELLULAR FOAM MOLDING

CROSS-REFERENCE TO RELATED APPLICATION

This application is a continuation-in-part (CIP) of U.S. patent application Ser. No. 15/542,752, filed Jul. 11, 2017, now abandoned.

BACKGROUND OF THE INVENTION

1. Field of the Invention

The invention relates to microcellular foam and more particularly to a method of microcellular foam molding an article having improved characteristics.

2. Description of Related Art

Physical or chemical foaming agents are added to polymeric foaming materials to form bubbles therein. The foaming process comprising the steps of forming gas bubbles, nucleation, and stabilization. Typically, gas under high pressure is dissolved into various polymers, relying on thermodynamic instability phenomena to cause the uniform arrangement of the gas bubbles.

Microcellular foam and their methods of manufacturing has become more standardized and improved upon since late 1970s. Trexel Inc. is often referred to as the industry standard for microcellular foam with their use of MuCell® Molding Technology which is characterized by connecting a device containing a supercritical fluid (SCF) to an injection molding machine, extrusion machine or vulcanizer for introducing the SCF into the injection molding machine, extrusion machine or vulcanizer to mix with polymers, and injecting the mixture into a mold. An article is produced after cooling the mold.

However, the conventional MuCell® Molding Technology has the following disadvantages: greater specific gravity (e.g., more than 0.4), low resilience, poor touch feeling, irregularities on the surface, and being not appropriate for the articleion of shoes, mats and exercise equipment. Further, using paraffin such as butane, pentane, or hexane or chemical compounds having a lower evaporation temperature as foaming agent is not environment-friendly. Furthermore, conventionally, polyolefin compound or elastomers are foamed externally of a mold prior to placing in the mold. This manufacturing process is time consuming, tedious and not economical.

Still conventionally, foaming internally of a mold has the following disadvantages: springs or the like being liable to damage, breakage and deformation; and the mold being liable to breakage.

Thus, the need for improvement still exists.

SUMMARY OF THE INVENTION

It is therefore one object of the invention to provide a method of microcellular foam molding an article, comprising the steps of filling a mold with a polyolefin compound; adding a crosslinking agent to the polyolefin compound to form a crosslinked mold; placing the crosslinked mold in a second mold having a plurality of vent holes; placing the second mold in a pressure vessel; dissolving gas under a predetermined pressure to form a supercritical fluid (SCF) in the pressure vessel; effusing the SCF through the vent holes into the crosslinked mold to form a SCF permeated mold; releasing pressure of the pressure vessel to cause the SCF permeated mold to foam; and finishing a foamed article in the second mold.

It is another object of the invention to provide a method of microcellular foam molding an article, comprising the steps of filling a mold with elastomers; placing the mold in a second mold having a plurality of vent holes; placing the second mold in a pressure vessel; dissolving gas under high pressure to form a supercritical fluid (SCF) in the pressure vessel; effusing the SCF through the vent holes into the mold to form a SCF permeated mold; releasing pressure of the pressure vessel to cause the SCF permeated mold to foam; and finishing a foamed article in the second mold.

The above and other objects, features and advantages of the invention will become apparent from the following detailed description taken with the accompanying drawings.

DETAILED DESCRIPTION OF THE INVENTION

Figure 1:
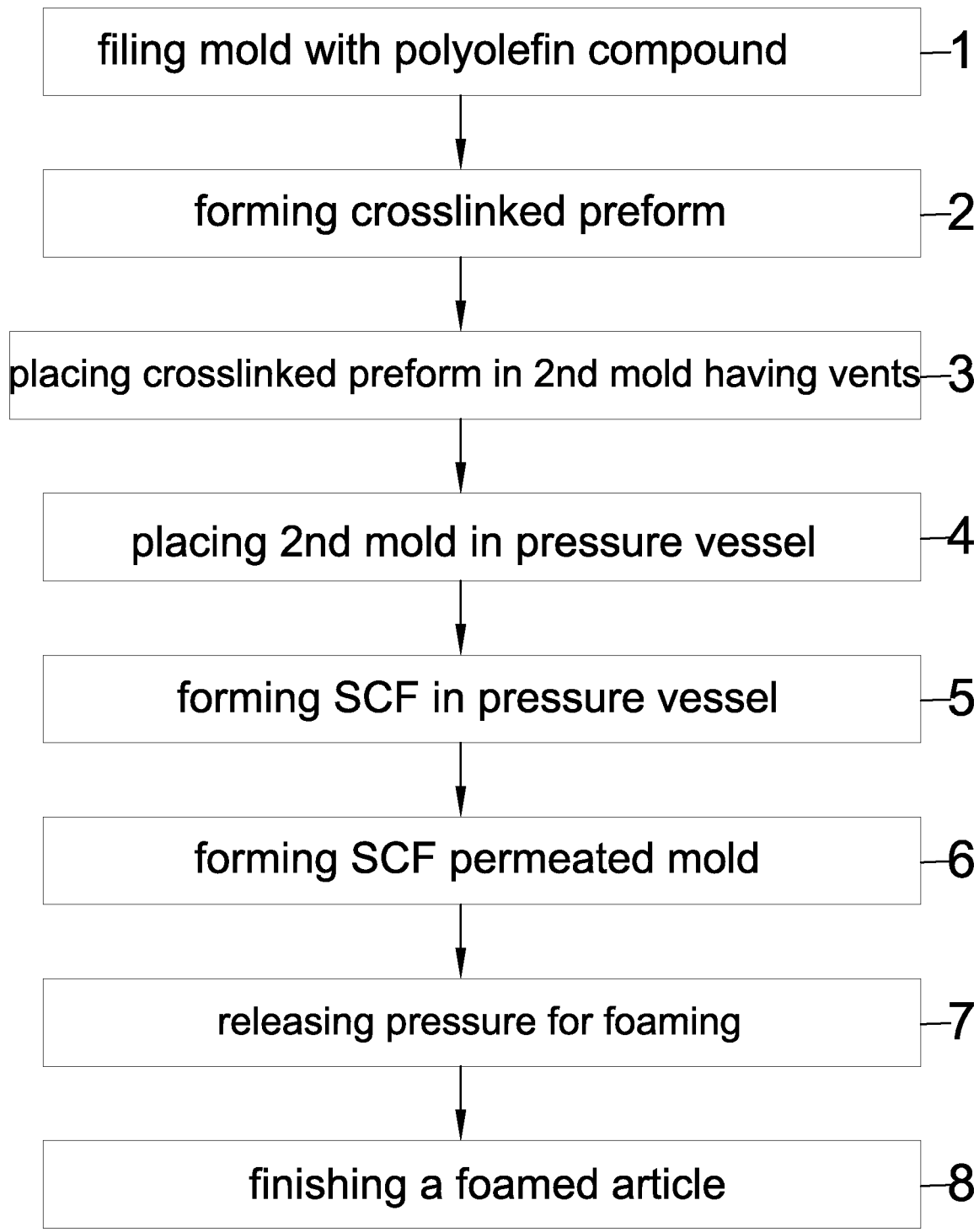
FIG. 1 is a flow chart of a method for manufacturing a foamed structure according to a first preferred embodiment of the invention.

Referring to FIG. 1, a method of microcellular foam molding an article according to a first preferred embodiment of the invention is illustrated and comprises the steps of (1) filling a mold with a polyolefin compound; (2) adding a crosslinking agent to the polyolefin compound to form a crosslinked mold; (3) placing the crosslinked mold in a second mold having vent holes; (4) placing the second mold in a pressure vessel; (5) dissolving gas under high pressure to form a supercritical fluid (SCF) in the pressure vessel; (6) effusing the SCF through the vent holes into the crosslinked mold to form a SCF permeated mold; (7) releasing pressure of the pressure vessel to cause the SCF permeated mold to foam; and (8) finishing a foamed article in the second mold.

It is noted that the polyolefin compound is shaped prior to step (1).

Figure 2:
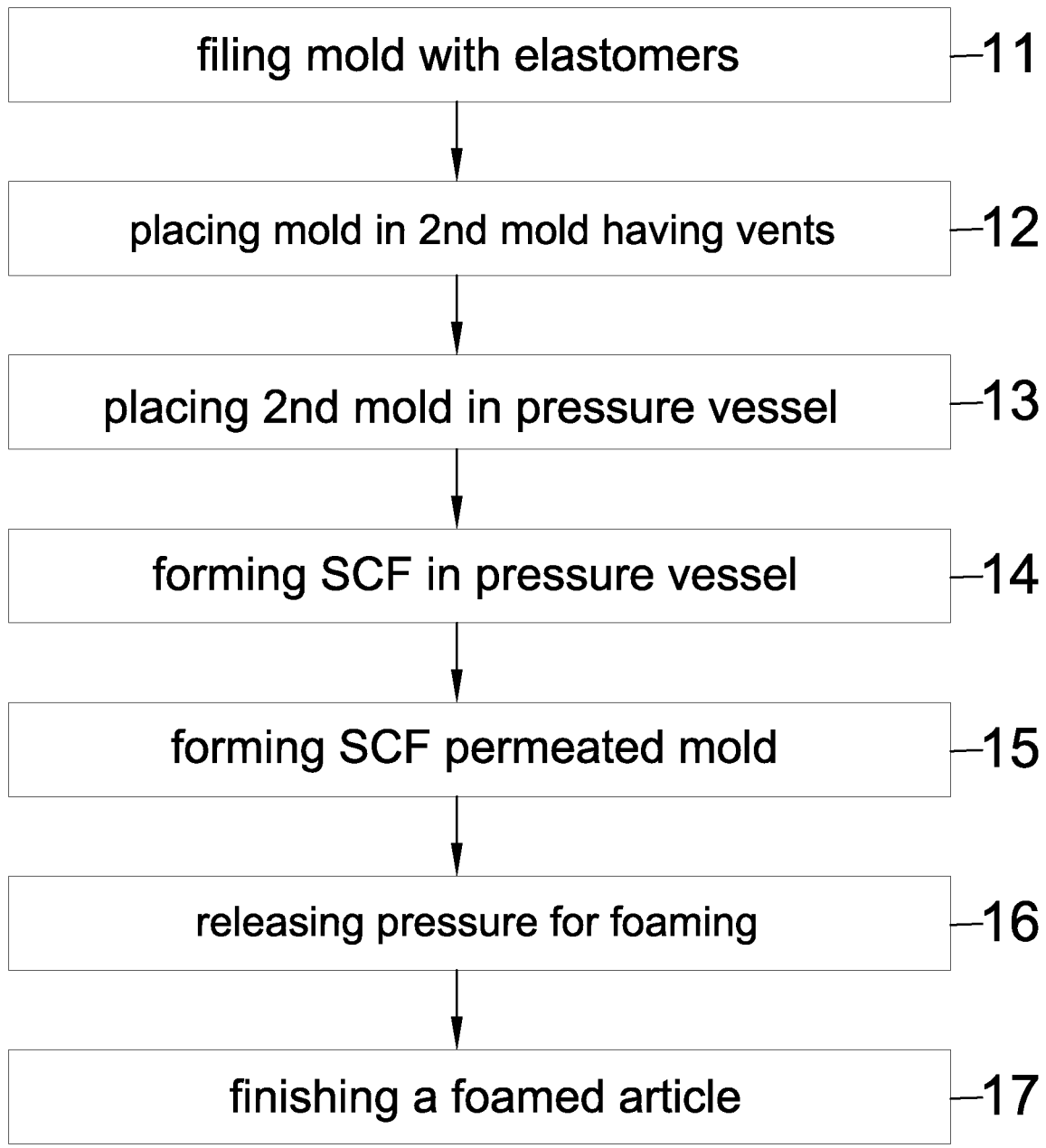
FIG. 2 is a flow chart of a method for manufacturing a foamed structure according to a second preferred embodiment of the invention.

Referring to FIG. 2, a method of microcellular foam molding an article according to a second preferred embodiment of the invention is illustrated and comprises the steps of (11) filling a mold with elastomers; (12) placing the mold in a second mold having vent holes; (13) placing the second mold in a pressure vessel; (14) dissolving gas under high pressure to form a supercritical fluid (SCF) in the pressure vessel; (15) effusing the SCF through the vent holes into the mold to form a SCF permeated mold; (16) releasing pressure of the pressure vessel to cause the SCF permeated mold to foam; and (17) finishing a foamed article in the second mold.

It is noted that the elastomers are shaped prior to step (11).

The polyolefin compound comprises polyolefin, crosslinking agent, filler, and chemical additive; and the polyolefin comprises at least one of ethylene-vinyl acetate (EVA), polyolefin elastomer (POE), and low-density polyethylene (LDPE) in which the polyolefin has 100 parts per hundred rubber (phr), the crosslinking agent has less than 1.2 phr, the filler has less than 20 phr, and the chemical additive has less than 5 phr.

Crosslinking agent comprises peroxide; filler comprises at least one of calcium carbonate, pulvistalci, mica powder, clay, zinc oxide and titanium dioxide; and chemical additive comprises at least one of paraffin, stearic acid, ate complex and calcium salt.

Elastomer is polyurethane (PU) or thermoplastic elastomer (TPE) which can be thermoplastic polyurethane (TPU), thermoplastic polyester elastomer (TPEE), Pebax® thermoplastic elastomer, or a combination thereof.

Temperature is in the range of 170-180° C. for crosslinking polyolefin compound in the mold; electron beam irradiation of 20-50 kGy is applied to form crosslinks in the polyolefin compound; and for effusing SCF, the high pressure is in 10-50 MPa range for 0.5-8 hours.

For effusing SCF, the highest temperature is 3° C. lower than the melting temperature of the material, and the lowest temperature is 5° C. higher than the softening temperature of the material. It takes 15 to 1200 seconds to lower pressure of the pressure vessel to room temperature.

Taking advantages of SCF, the foamed articles have advantages including low specific gravity, no pollution to the environment, excellent resilience, and smooth surface. The formed article is produced by SCF effusing and foaming in the multiple molds in situ. It greatly decreases the manufacturing cost with high yield. Finally, the step of foaming by heating saves material and prevents components from being damaged.

For EVA taken as polyolefin, EVA has a 5%-40% mole. For a combination of EVA and POE taken as polyolefin, a composition ratio of EVA and POE is 100/0.1-0.1/100. For a combination of EVA, POE and ethylene propylene diene monomer (EPDM) rubber taken as polyolefin, a combination ratio of EVA, POE, and EPDM rubber is 100/0.1/0.1-0.1/100/20.

The crosslinking agents comprise daichlorophenols (DCP) and Bis(tert-butylperoxy isopropyl) benzene (BIPB).

Injection molding machine, extrusion machine or vulcanizer is used to fill a mold with the polyolefin compound. The mold is not limited to a specific shape. For example, the mold can be flat or particle shaped. The filling of mold is done at specific conditions. For example, with respect to the polyolefin compound, molding temperature is in the range of 160-180° C., molding pressure is 10 Mpa, and molding time is 400-550 seconds.

After forming the mold, for increasing the linking strength of the molecules of the polyolefin compound, crosslinking is formed in the mold by chemical reactions that are initiated by heat, pressure, or electron beam irradiation. As a result, a crosslinked mold is obtained. For example, the mold is heated at 170-180° C. to form crosslinks therein. Specifically, the added crosslinking agent causes the molecules of the polyolefin compound to form crosslinks. A vulcanization curve may show the increase in viscosity of the polyolefin compound during crosslinking. Alternatively, electron beam irradiation of 20-50 kGy is applied to form crosslinks in the polyolefin compound.

Examples of the SCF are carbon dioxide and nitrogen.

In the forming of the mold allowing a SCF to effuse through, the effusion amount of the SCF is between 0.6 w % and 15 w %, or preferably between 0.8 w % and 10 w %.

The high pressure is in 10-50 MPa range and the crosslinking process takes 0.5-8 hours. Preferably, the crosslinking process takes 1-5 hours.

The high pressure decreased to the atmospheric pressure takes 15-40 minutes for the sakes of improving performance and controlling prefoaming. The prefoaming ratio is in 1-1.4 range in which one represents no prefoaming.

For effusing SCF, the highest temperature is 3° C. lower than the melting temperature of the material in which the material becomes molten when the temperature for effusing SCF approaches the melting temperature of the material. As a result, it is impossible of effusing SCF through the material.

The lowest temperature is 5° C. higher than the softening temperature of the material in which the material becomes excessively hardened when temperature for effusing SCF approaches the softening temperature of the material. As a result, it is impossible of retaining SCF in the material.

A lengthwise ratio of the mold before foaming to the foamed article is 1:1.5-1:3.5 and preferably, 1:1.7-1:2.5.

The foamed article contains billions of tiny bubbles having an average diameter of 0.1-3 mm and a specific gravity of 0.03-0.30 g/cm$^3$ decreased from an initial specific gravity of 1.0 g/cm$^3$. Preferably, the bubbles have a specific gravity of 0.25 g/cm$^3$. More preferably, the bubbles have a specific gravity of 0.20 g/cm$^3$.

The foamed article has many applications including mats, shoes, exercise equipment, toys and packing materials.

Embodiment 1: EVA of 100 phr and having 26% mole, calcium carbonate of 1 phr, paraffin of 0.5 phr, and DCP of 0.5 phr are added to a mixer to mix for 12 minutes under conditions of 100° C. and 0.75 Mpa. Then the mixture is sent to an extrusion machine to produce plastic granules. The granules are sent to an EVA injection molding machine to heat at 180° C. for melting and forming crosslinks in the molten polyolefin compound in the mold. Next, the mold having the crosslinked polyolefin compound is sent to a pressure vessel with a SCF (e.g., carbon dioxide) being introduced. The pressure vessel is heated at 50° C. and kept at 40 Mpa for 2 hours. Next, the internal pressure of the vessel is decreased to the atmospheric pressure in 30 minutes. As such, a mold allowing an SCF to effuse through is obtained, it has a foaming ratio of at least 1.5, and it has an effusion amount of the SCF of 10 w %. The mold allowing an SCF to effuse through is placed in a heater for foaming at 80° C. for 20 minutes. As a result, a foamed article having a smooth surface is finished. Bubbles of the finished foamed article are measured by an optical microscope, and density thereof is measured by a specific gravity scale. Bouncing capability of the finished foamed article is tested based on ASTM D2632: a conic steel ball having weight of 28±0.5 g free falls on a sample of foaming plastic from a height of 400 mm in which the ratio of a bouncing height of the steel ball to 400 mm is the bouncing capability of the finished foamed article. The finished foamed article has a specific gravity of 0.16, an average diameter of the bubbles in the finished foamed article is 0.5-1.5 mm, and the bouncing capability of the finished foamed article is 55%.

Embodiment 2: EVA is replaced by a compound of EVA (60%)/POE (40%) in which ethenyl acetate in the EVA has 26% mole, and POE having a serial number 8150 is produced by Dows Inc. Other manufacturing steps are the same as that of embodiment 1. The finished article is a foamed article.

The finished foamed article has a specific gravity of 0.13, an average diameter of the bubbles in the finished foamed article is 0.5-1.5 mm, and the bouncing capability of the finished foamed article is 60%.

Embodiment 3: EVA is replaced by a compound of EVA (60%)/POE (40%) in which ethenyl acetate in the EVA has 26% mole, and POE having a serial number 8150 is produced by Dows Inc. and carbon dioxide is replaced by nitrogen as SCF. Other manufacturing steps are the same as that of embodiment 1. The finished article is a foamed article.

The finished foamed article has a specific gravity of 0.15, an average diameter of the bubbles in the finished foamed article is 0.5-2.5 mm, and the bouncing capability of the finished foamed article is 60%.

Embodiment 4: EVA is replaced by a compound of TPU having a serial number 85AU10 produced by Sistron Inc. and the steps of mixing and crosslinking are omitted. Other manufacturing steps are the same as that of embodiment 1. The finished article is a foamed article.

The finished foamed article has a specific gravity of 0.28, an average diameter of the bubbles in the finished foamed article is 0.5-1.5 mm, and the bouncing capability of the finished foamed article is 55%.

Embodiment 5: Peroxide crosslinking agent is not used. Other components of the foaming materials are the same as that of embodiment 3. Electron beam irradiation of 20-50 kGy is applied to form crosslinks. Other manufacturing steps are the same as that of embodiment 3. The finished article is a foamed article.

The finished foamed article has a specific gravity of 0.14, an average diameter of the bubbles in the finished foamed article is 0.5-2.5 mm, and the bouncing capability of the finished foamed article is 60%.

Exemplary example 1: The conventional MuCell® Molding Technology is used in which a SCF foaming device is used to produce TPU foaming articles. Hopper is heated to 210° C. and the mold is heated to 30° C. SCF is introduced to an injection molding machine to mix with molten TPU. The molten TPU mixture is injected into a mold cavity to be formed. The SCF reacts with the molten TPU mixture to form bubbles in the mold cavity. The finished foamed article has the same size as that of the mold cavity but has irregularities on the surface. The finished foamed article has a specific gravity of 0.55, an average diameter of the bubbles in the finished foamed article is 0.8-1.5 mm, and the bouncing capability of the finished foamed article is 53%.

Exemplary example 2: except the prefoaming ratio greater than 1.6 after introducing the SCF, other manufacturing steps are the same as that of embodiment 1. The finished article is a foamed article.

The finished foamed article has a specific gravity of 0.22, an average diameter of the bubbles in the finished foamed article is 0.5-1.7 mm, and the bouncing capability of the finished foamed article is 50%.

Exemplary example 3: except the crosslinking agent DCP has 1.25 phr in the embodiment 1, other manufacturing steps are the same as that of embodiment 1. The finished article is a foamed article.

The finished foamed article has a specific gravity of 0.32, an average diameter of the bubbles in the finished foamed article is 0.2-0.8 mm, and the bouncing capability of the finished foamed article is 40%.

Exemplary example 4: except the crosslinking agent DCP has 0.12 phr in the Embodiment 1, other manufacturing steps are the same as that of embodiment 1. The finished article is a foamed article.

The finished foamed article has a specific gravity of 0.42, an average diameter of the bubbles in the finished foamed article is 0.2-0.6 mm, and the bouncing capability of the finished foamed article is 35%.

Exemplary example 5: except the crosslinking agent DCP has 0.12 phr in the embodiment 2, other manufacturing steps are the same as that of embodiment 2. The finished article is a foamed article.

The finished foamed article has a specific gravity of 0.35, an average diameter of the bubbles in the finished foamed article is 0.1-0.8 mm, and the bouncing capability of the finished foamed article is 42%.

While the invention has been described in terms of preferred embodiments, those skilled in the art will recognize that the invention can be practiced with modifications within the spirit and scope of the appended claims.

What is claimed is:

1. A method of microcellular foam molding an article, comprising the steps of:
   (1) filling a mold with a polyolefin compound;
   (2) adding a crosslinking agent to the polyolefin compound to form a crosslinked preform;
   (3) placing the crosslinked preform in a second mold having a plurality of vent holes;
   (4) placing the second mold in a pressure vessel;
   (5) dissolving gas under a predetermined pressure to form a supercritical fluid (SCF) in the pressure vessel;
   (6) effusing the SCF through the vent holes into the crosslinked preform to form a SCF permeated mold;
   (7) releasing pressure of the pressure vessel to cause the SCF permeated mold to foam; and
   (8) finishing a foamed article in the second mold.

2. The method of claim 1, wherein the polyolefin compound is shaped prior to step (1).

3. The method of claim 1, wherein the polyolefin compound comprises at least one of ethylene-vinyl acetate (EVA), polyolefin elastomer (POE), low-density polyethylene (LOPE), and polypropylene (PP).

4. The method of claim 1, wherein the polyolefin compound comprises polyolefin, crosslinking agent, filler, and chemical additive; and wherein the polyolefin has 100 parts per hundred rubber (phr), the crosslinking agent has less than 1.2 phr, the filler has less than 20 phr, and the chemical additive has less than 5 phr.

5. The method of claim 3, wherein the crosslinking agent comprises peroxide; wherein the filler comprises at least one of calcium carbonate, pulvistalci, mica powder, clay, zinc oxide and titanium dioxide; and wherein chemical additive comprises at least one of paraffin, stearic acid, ate complex and calcium salt.

6. The method of claim 1, wherein temperature is in the range of 170-180° C. for crosslinking polyolefin compound in the mold.

7. The method of claim 1, wherein electron beam irradiation of 20-50 kGy is applied to form crosslinks in the SCF permeated mold.

8. The method of claim 1, wherein the predetermined pressure is in 10-50 MPa range for 0.5-8 hours.

9. The method of claim 1, wherein in effusing the SCF, a highest temperature is 3° C. lower than a melting temperature of the polyolefin compound, and a lowest temperature is 5° C. higher than a softening temperature of the polyolefin compound.

10. The method of claim 1, wherein step (7) of releasing pressure of the pressure vessel takes about 15 to 1,200 seconds to lower pressure of the pressure vessel to room temperature.

11. A method of microcellular foam molding an article, comprising the steps of:
   (a) filling a mold with elastomers;
   (b) placing the mold in a second mold having a plurality of vent holes;
   (c) placing the second mold in a pressure vessel;
   (d) dissolving gas under high pressure to form a supercritical fluid (SCF) in the pressure vessel;
   (e) effusing the SCF through the vent holes into the mold to form a SCF permeated mold;

(f) releasing pressure of the pressure vessel to cause the SCF permeated mold to foam; and (g) finishing a foamed article in the second mold.

12. The method of claim 11, wherein the elastomers are shaped prior to step (a).

13. The method of claim 11, wherein the elastomer is polyurethane (PU) or thermoplastic elastomer (TPE); and wherein the TPE is thermoplastic polyurethane (TPU), thermoplastic polyester elastomer (TPEE), or a combination thereof.

14. The method of claim 11, wherein the predetermined pressure is in 10-50 MPa range for 0.5-8 hours.

15. The method of claim 11, wherein in effusing the SCF, a highest temperature is 3° C. lower than a melting temperature of the elastomers, and a lowest temperature is 5° C. higher than a softening temperature of the elastomers.

16. The method of claim 10, wherein step (f) of releasing pressure of the pressure vessel takes about 15 to 1,200 seconds to lower pressure of the pressure vessel to room temperature.

* * * * *